Figure 1:
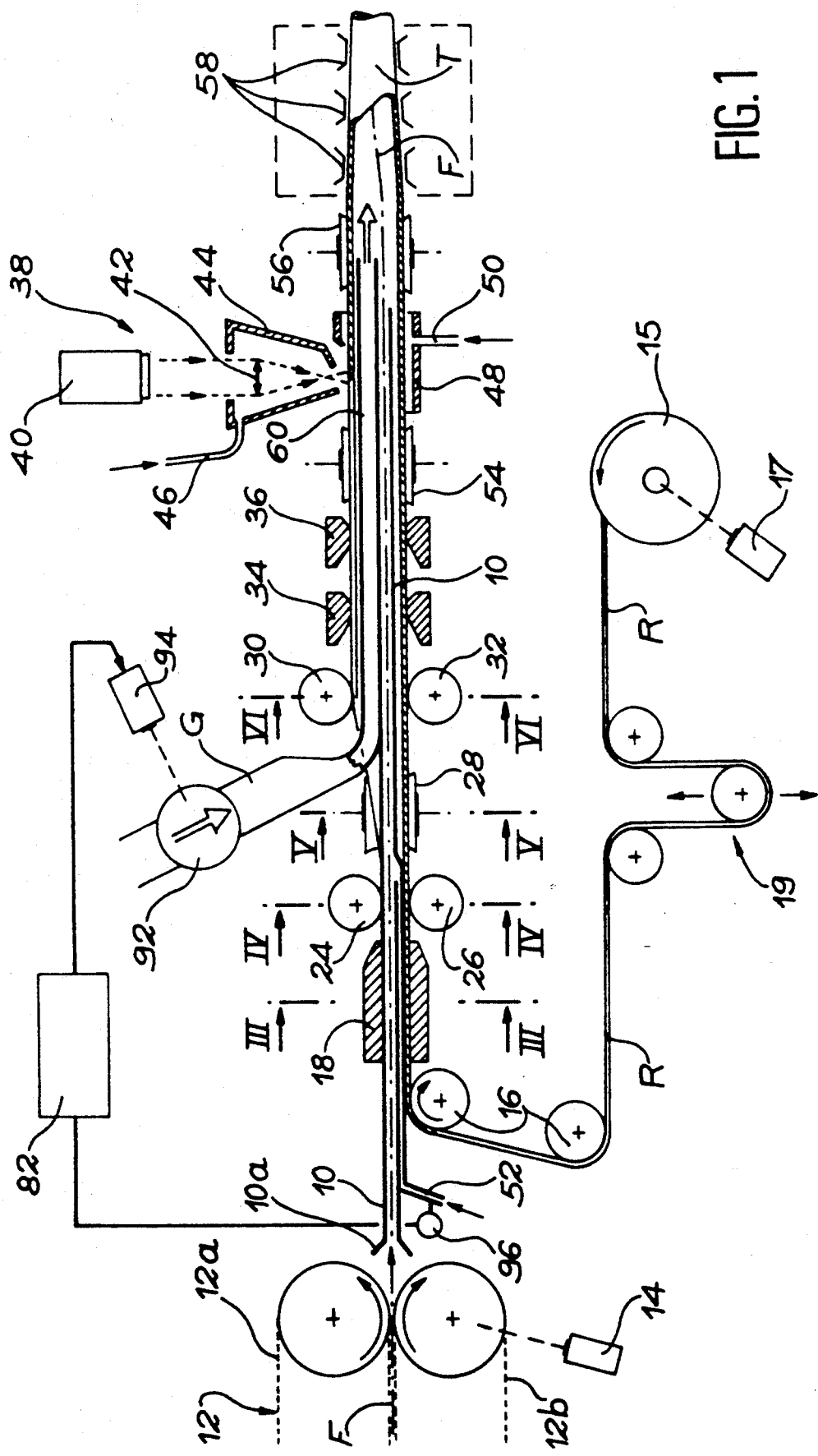

United States Patent [19]

Laupretre et al.

[11] Patent Number: 5,143,274
[45] Date of Patent: Sep. 1, 1992

[54] PROCESS AND APPARATUS FOR THE MANUFACTURE OF OPTICAL MODULES

[75] Inventors: Jean-Jacques Laupretre, Laversines; Franck Chapelet, Beauvais; Dominique Bretheau, Quincy S/Senart, all of France

[73] Assignee: Societe Foptica S.A. & Commissariat a l'Energie Atomique, Paris, France

[21] Appl. No.: 659,426

[22] PCT Filed: Jul. 23, 1990

[86] PCT No.: PCT/FR90/00558
  § 371 Date: Mar. 20, 1991
  § 102(e) Date: Mar. 20, 1991

[87] PCT Pub. No.: WO91/01506
  PCT Pub. Date: Feb. 7, 1991

[30] Foreign Application Priority Data

Jul. 24, 1989 [FR] France .................... 89 09938

[51] Int. Cl.[5] .................. B23K 31/02; H04B 9/00
[52] U.S. Cl. .................... 228/102; 228/148; 228/9; 228/17.5
[58] Field of Search .......... 228/102, 146-148, 228/219, 9, 17.5, 42; 29/728; 72/52; 156/54

[56] References Cited

U.S. PATENT DOCUMENTS

| | | | |
|---|---|---|---|
| 4,372,792 | 2/1983 | Dey et al. | 156/54 |
| 4,741,470 | 5/1988 | Winter et al. | 228/148 |
| 4,852,790 | 8/1989 | Karlinski | 228/148 |
| 4,949,894 | 8/1990 | Winter et al. | 228/148 |
| 5,007,703 | 4/1991 | Hale et al. | 228/148 |

FOREIGN PATENT DOCUMENTS

| | | | |
|---|---|---|---|
| 0299123 | 1/1989 | European Pat. Off. | 228/148 |
| 59-97717 | 6/1984 | Japan | 228/148 |

Primary Examiner—Samuel M. Heinrich
Attorney, Agent, or Firm—Pearne, Gordon, McCoy & Granger

[57] ABSTRACT

For the continuous manufacture of optical modules incorporating optical fibres placed within a metal tube and embedded in a sealing product, the fibres (F) are introduced into a rectilinear guide tube (10) and the metal tube (T) is progressively formed around said guide tube from a tape or ribbon (R). The metal tube is then welded along the joint line slightly upstream of the front end of the guide tube (10). In order to permanently check the length ratio between the fibres and the metal tube in the thus obtained optical module, the fibres are introduced into the guide tube at a speed determined in real time on the basis of the measured values of the tensile force exerted on the welded tube, the speed of movement and the temperature of said tube. The sealing product (G) is injected into the welded tube slightly downstream of the front end of the guide tube (10) at a controlled flow rate so as to ensure a complete and non-excessive filling of the metal tube.

22 Claims, 5 Drawing Sheets

PROCESS AND APPARATUS FOR THE MANUFACTURE OF OPTICAL MODULES

DESCRIPTION

The invention relates to a process and an apparatus making it possible to manufacture very long optical modules able to transport optical signals in a random medium, which can be solid, liquid or gaseous. These modules are then assembled optionally with components of other types (e.g. electrical conductors or carrier elements) in order to form a cable.

Such modules are presently used in numerous industries and in particular in the telecommunications field. They comprise a tight metal tube, generally made from steel, in which are placed one or more optical fibres embedded in a sealing product such as a gel or grease.

EP-A-0 299 123, proposes a process and an apparatus making it possible to continuously manufacture such optical modules. According to this process, the metal tube is obtained from a metal ribbon, which firstly passes into a first series of shaping rollers giving the ribbon the shape of a partly formed tube and which has a longitudinal slit. The optical fibres and then introduced from above through said slit. The partly formed tube is then passed into a second series of shaping rollers, which gives it the shape of a closed tube with a longitudinal joint line. The tube is then laser welded along the joint line.

In one of the embodiments described in EP-A-0 299 123, the fibres are introduced by a guide tube, into which is also injected a carrier gas. This guide tube is extended up to the contact point of the metal tube with a capstan, which ensures the tension of the metal tube. A sealing product injection tube follows an identical path to that of the guide tube and on the capstan is extended beyond said guide tube.

Although the general production principle disclosed in said document is satisfactory, the apparatus described and claimed therein does not really take account of the particular difficulties resulting from the brittleness of optical fibres, which are only able to withstand minimum mechanical stresses, otherwise there is a reduction in the transmission quality of the optical signals through the said fibres.

Thus, the apparatus described in EP-A-0 299 123 introduces an extra length of fibres into the metal tube, so as to ensure that these fibres are not tensioned during use. However, as the fibres are introduced from above into the partly formed tube, the tension applied to these fibres by the capstan is subject to uncontrollable variations. Moreover, the temperature of the metal tube heated by the shaping process varies during the operation of the apparatus, particularly at the start of manufacture, which is not taken into account by the apparatus. Finally, the apparatus described in this document also does not take account of the fact that, for a given capstan, the extra length of fibres compared with the metal tube is dependent on the diameter of the latter.

As a result of these uncontrollable variations and imprecisions, the apparatus described in EP-A-0 299 123 does not make it possible to sufficiently accurately control or check the length ratio in the manufactured optical cable between the optical fibres and the metal tube. Thus, in the temperature range in which these optical modules are used, there is an undesirable stressing of the optical fibres, which is prejudicial to a good transmission of the optical signals.

Moreover, the apparatus described in EP-A-0 299 123 does not bring about a satisfactory filling of the metal tube by the sealing product. Thus, the product is introduced into the tube beyond the contact point of the latter with the capstan and it is not possible to check the filling. Consequently in order to prevent a rise of the product in the metal tube up to the welding station for the latter, it is necessary to carry out an underfilling.

The present invention mainly relates to a process and an apparatus making it possible to continuously manufacture modules, whilst permitting a precise and adjustable checking of the length ratio between the optical fibres and the metal tube, said length ratio being determined as a function of the cable operating conditions and in particular the operating temperature range for said cable and its tension in use, so as to ensure an optimum functioning of the latter, whilst limiting to the greatest possible extent the stresses withstood by the optical fibres.

A secondary object of the invention is to provide a process and an apparatus for the continuous manufacture of optical modules, in which the sealing product quantity introduced into the metal tube is checked, in order to guarantee a complete, non-excessive filling of the tube.

According to the invention, the first of these objects is achieved by means of a process for the manufacture of optical modules incorporating a tight metal tube, in which is received at least one optical fibre embedded in a sealing product, characterized in that it comprises the following stages:

introduction of the optical fibre into a rectilinear guide tube at a controlled introduction speed;

progressive shaping of the metal tube around the guide tube from a metal ribbon until a closed tube with a longitudinal joint line is obtained;

welding said closed tube along the longitudinal joint line;

injection of the sealing product into the welded tube through an injection pipe issuing into the said tube below the welding joint;

measurement of the instantaneous values of the tensile force applied to the welded tube, the travel speed and the temperature of said welded tube; and control of the speed of introduction of the optical fibre into the guide tube as a function of the measured instantaneous values, so as to obtain a predetermined ratio between the lengths of the metal tube and the optical fibre.

Preferably, the second aforementioned object is also achieved by the fact that this process also comprises the following stages:

introduction of a neutral gas into the welded metal tube by a supply pipe juxtaposed with the injection pipe for the sealing product and issuing upstream of the said pipe;

measurement of the neutral gas pressure in the supply pipe;

regulation of the injection flow rate of the sealing product as a function of sudden variations of the neutral gas pressure measured in the supply pipe and resulting from a closure or filling of said pipe by the sealing product.

The invention also proposes apparatus for the manufacture of optical modules incorporating a tight metal tube, in which is received at least one optical fibre embedded in a sealing product, characterized in that it comprises:

means for introducing the optical fibre into a rectilinear guide tube at a controlled introduction speed;

means for the progressive shaping of said metal tube around the guide tube from a metal ribbon making it possible to produce a closed tube having a longitudinal joint line;

means for welding the said closed tube along the longitudinal joint line;

means for injecting the sealing product into the welded tube by an injection pipe issuing into the latter downstream of the welding means;

means for measuring the instantaneous values of the tensile force applied to the welded tube, the travel speed and the temperature of the said welded tube and means for controlling the introduction speed of the optical fibre into the guide tube by said means for introducing the fibre into the guide tube, as a function of said instantaneous values, so that the lengths of the metal tube and the optical fibre are in a predetermined ratio.

Advantageously, said apparatus also comprises means for introducing a neutral gas into the welded metal tube by a supply pipe juxtaposed with the injection pipe for the sealing product and issuing upstream of the said pipe, means for measuring the pressure of the neutral gas in the supply pipe and means for regulating the injection flow rate of the sealing product as a function of sudden variations of the measured neutral gas pressure resulting from a closing or filling of said supply pipe by the sealing products.

In a preferred embodiment of the invention means for drawing the welded metal tube and means for cooling said tube are positioned between the welding means and the measuring means. In addition, the quality of the weld is e.g. checked by eddy current defect detection means.

A preferred embodiment of the invention is described in greater detail hereinafter relative to the attached drawings, wherein show:

FIG. 1: a partial and highly diagrammatic longitudinal sectional view of part of an optical module manufacturing apparatus according to the invention, illustrating the principle of producing an optical cable by means of the said apparatus (the ratio between the cable diameter and the cable length has been deliberately increased to make the drawing more readily understandable).

Figure 2:
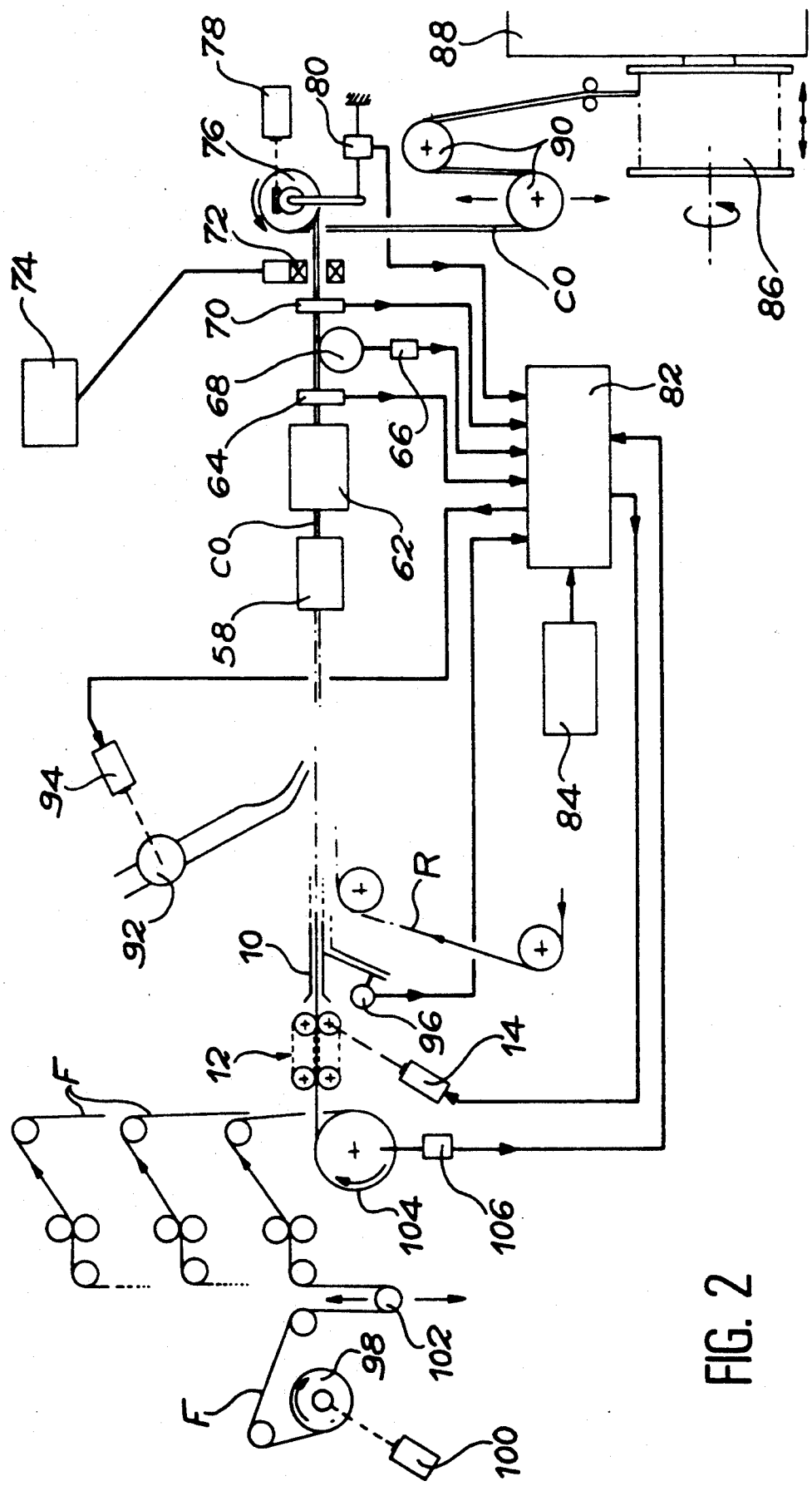

FIG. 2: diagrammatically the kinematic chain of the apparatus according to the invention, the part of said apparatus illustrated in FIG. 1 not being shown.

Figure 3:
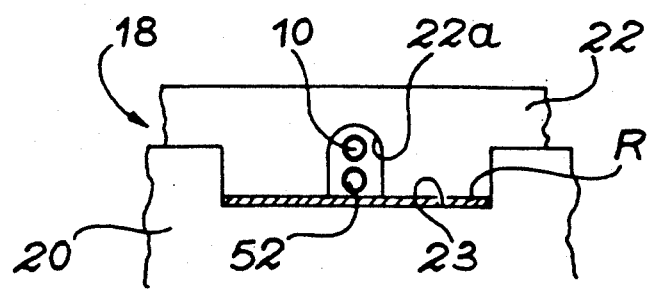

FIG. 3: a larger scale sectional view along line III—III of FIG. 1.

Figure 4:
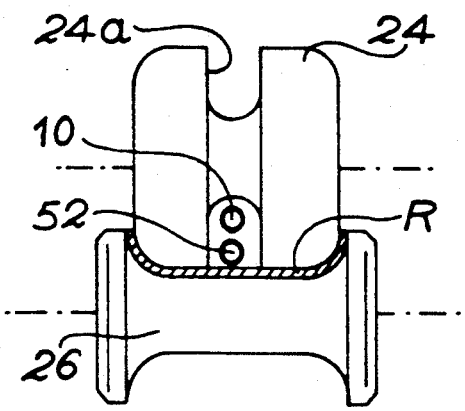

FIG. 4: a larger scale sectional view along line IV—IV of FIG. 1.

Figure 5:
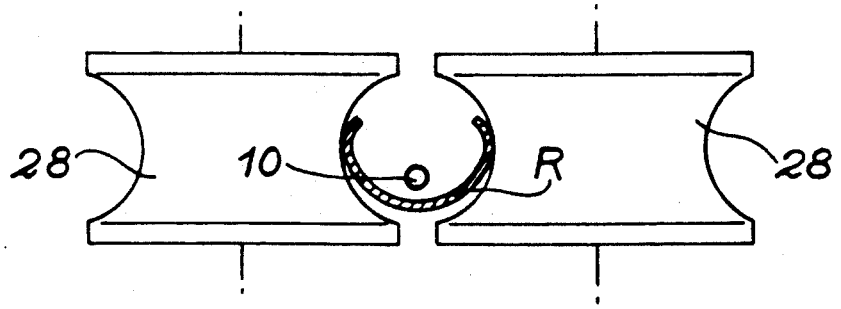

FIG. 5: a larger scale sectional view along line V—V of FIG. 1.

Figure 6:
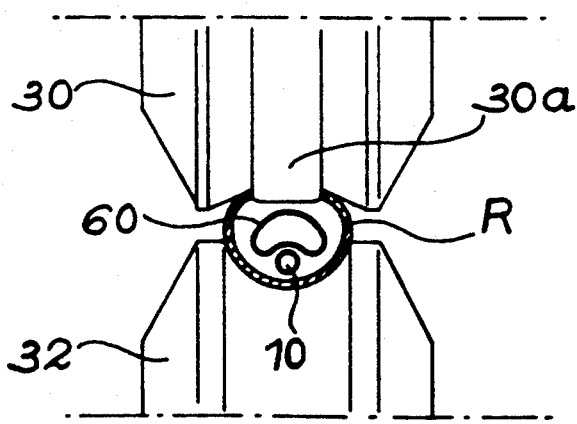

FIG. 6: a larger scale sectional view along line VI—VI of FIG. 1.

Figure 7:
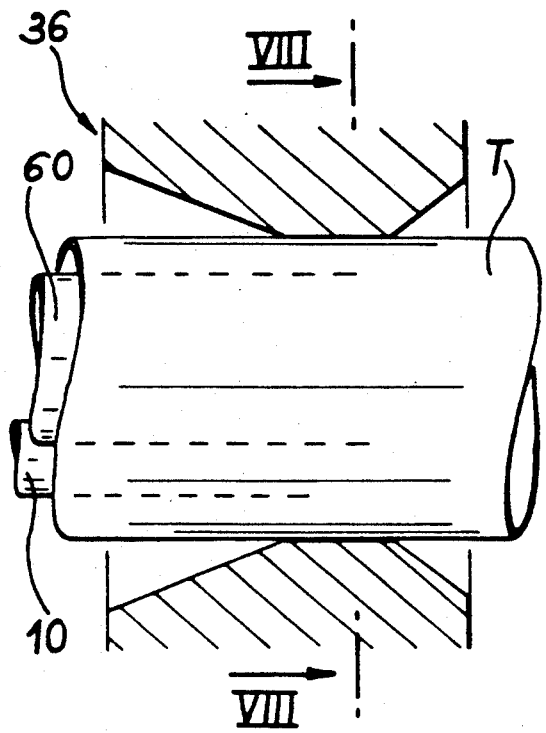

FIG. 7: a sectional side view on a larger scale of one of the dies of the apparatus illustrated in FIG. 1.

Figure 8:
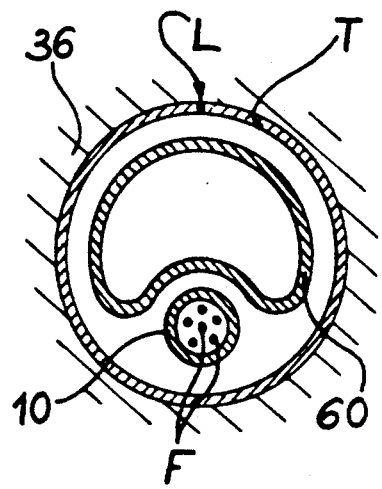

FIG. 8: a sectional view along line VIII—VIII of FIG. 7.

Figure 9:
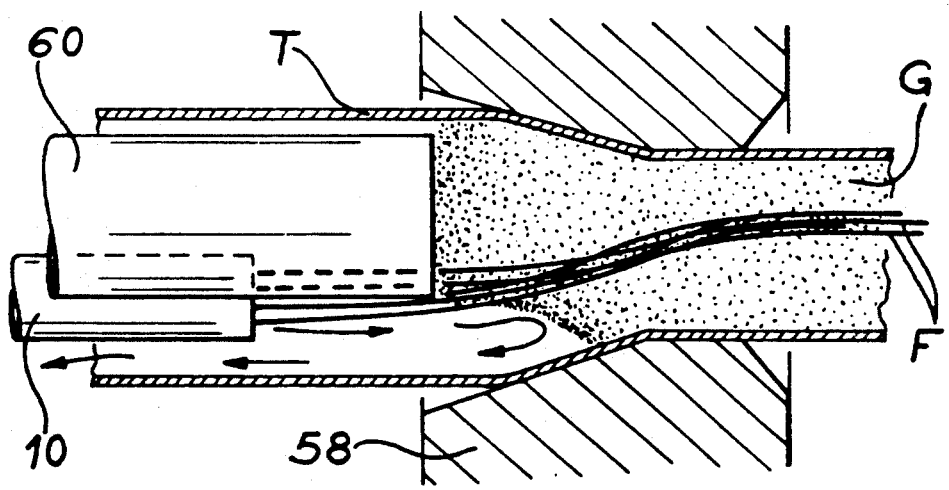

FIG. 9: a sectional side view illustrating that part of the apparatus of FIG. 1 located immediately downstream of the welding means.

Figure 10:
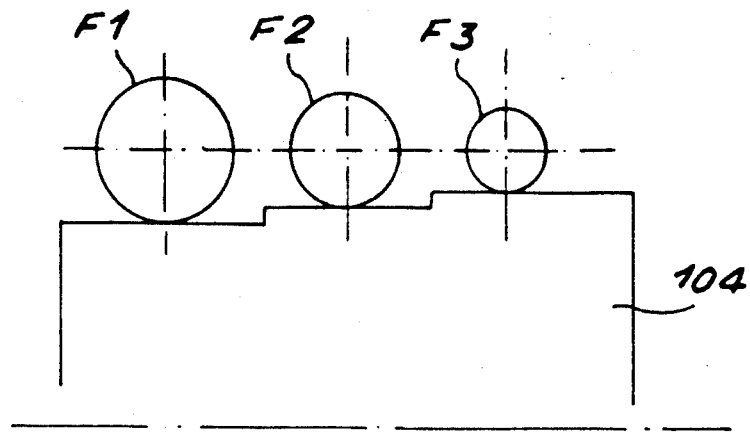

FIG. 10: a diagrammatic sectional view of the capstan for supplying fibres to the apparatus.

Figure 11:
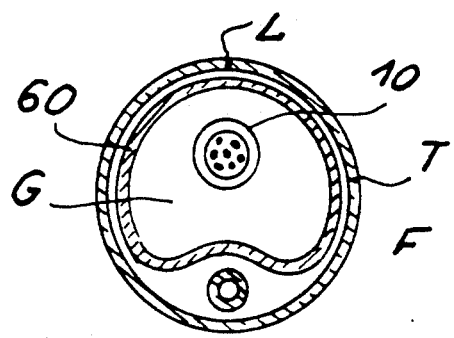
Figure 12:
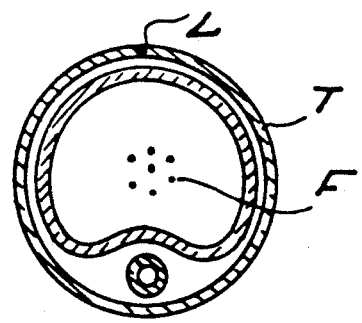

FIG. 11 and FIG. 12: sectional views comparable to FIG. 8 illustrating two variants of the invention.

The apparatus for manufacturing optical modules illustrated by the drawings is designed in such a way that the ratio between the lengths of the metal tube and the optical fibre constituting the optical module obtained has a precise value predetermined as a function of the cable operating conditions and in particular the operating temperature range for said cable and its tension in use. The accuracy to be obtained as regards to the said length ratio is approximately 0.0001. Generally, said ratio is slightly below 1, i.e. the fibre is longer than the metal tube. However, in certain cases said ratio can exceed 1, particularly when the module has to be used at low temperatures. In all cases, the precise checking of the ratio between the lengths of the tube and the optical fibres makes it possible to ensure that the latter function under optimum mechanical conditions, i.e. while avoiding to the greatest possible extent there being subjected to tensile or compressive loads under the effect of differential elongation between the tube and the optical fibres.

Firstly a description will be given of the central and largely mechanical part of the optical module manufacturing apparatus according to the invention with reference to FIG. 1. This apparatus part is designed so as to introduce one or more usually several optical fibres F into a welded metal tube T, normally made from stainless steel and without the fibres F undergoing any path deflection during their introduction.

To this end, that part of the apparatus illustrated in FIG. 1 comprises a rectilinear guide tube 10, which is horizontally positioned in the embodiment shown. The optical fibres F are introduced into the guide tube 10 through a widened end 10a of the latter, under the action of appropriate introduction means and constituted in the embodiment shown by a fibre introduction caterpillar or track 12.

More specifically, the fibre introduction caterpillar 12 comprises two conveyors 12a, 12b defining between them a horizontal contact plane located in the extension of the axis of the guide tube 10 and the fibres F are pressed between said conveyors, so that they are driven by the latter towards the end 10a of the guide tube 10, which is in the immediate vicinity of the fibre introduction caterpillar 12. One of the conveyors of the fibre introduction caterpillar 12, e.g. the lower conveyor 12b, is driven at a controlled speed by an auto-synchronous motor 14. As will be shown hereinafter, the operation of the said motor 14 is permenently controlled, so that the introduction of the fibres F into the tube T makes it possible to obtain the desired length ratio between the same.

That part of the machine illustrated in FIG. 1 also comprises means making it possible to progressively form or shape the tube T around the optical fibre F from a metal tape or ribbon R, whose width is slightly in excess of the circumference of the optical cable tube which it is wished to manufacture.

The metal ribbon R is delivered by a reel 15 rotated by a geared motor 17 incorporating a direct current motor. After passing over a position control tension pulley device 19 making it possible to regulate the delivery thereof and then on return pulleys 16, the metal ribbon R travels parallel to the axis of the guide tube 10 and in the same direction as the fibres F, immediately below the guide tube and in the vicinity of the end 10a by which the fibres are introduced into the latter.

As from the start of its travel parallel to the guide tube 10, the metal ribbon R passes through a laterally positioned die 18 shown in greater detail in FIG. 3. This die 18 comprises a lower part 20 and an upper part 22 forming between them a horizontal passage 23, whose rectangular section corresponds to the section of the ribbon R. The upper part 22 also has a central recess 22a issuing into the passage 23 and into which passes the guide tube 10. Said die 18 makes it possible to ensure a very precise lateral and height positioning of the metal ribbon R relative to the guide tube 10, without requiring any deflection of the rectilinear path followed the latter and by the fibres which it guides.

On passing out of the positioning die 18, the metal ribbon R passes into means making it possible to progressively form or shape the metal tube T from the ribbon R.

In the embodiment shown in FIG. 1, said progressive shaping means firstly comprise a pair of rollers 24,26 for preshaping the lateral edges of the ribbon R. As is more specifically illustrated by FIG. 4, the axes of the rollers 24,26 are located in the same vertical plane and are positioned parallel to one another and to the horizontal plane formed at said point by the ribbon R. The upper roller 24 is placed above the ribbon R and has in its central part an annular groove 24a permitting the passage of the rectilinear guide tube 10 without any deflection of the part of the latter. The lateral edges of the upper roller 24 have a convex section in the form of circular arcs of approximately 90°, whose radius approximately corresponds to the radius which it is wished to give to the metal tube T to the right of the welding station. The lower roller 26 is placed below the metal ribbon R and has on its lateral edges a concave section with a complementary circular arc configuration to that of the lateral ends of the upper roller 24. Therefore the assembly formed by the rollers 24 and 26 makes it possible to preshape the lateral edges of the ribbon R, in the manner illustrated by FIG. 4.

On referring once again to FIG. 1, as well as to FIG. 5, it can be seen that the ribbon R, whose edges have been preshaped by the rollers 24 and 26, then passes between the two tube preshaping rollers 28. The latter are identical and are located on either side of the ribbon R, their axes being disposed in the same vertical plane oriented transversely with respect to the ribbon, said axes also being vertical and parallel to one another. The outer surfaces of the rollers 28 are concave surfaces having a nearly semicircular cross section and whose radius is approximately equal to the diameter of the metal tube to the right of the welding station. As illustrated in FIG. 5, the rollers 28 make it possible to inwardly curve the central part of the metal ribbon R, in order to give the latter the shape of an open tube blank on the top and which is partly closed around the guide tube 10 by which the optical fibres are introduced.

Downstream of the tube preshaping rollers 28 and as illustrated in FIGS. 1 and 6, the tube blank passes between two orientation rollers 30,32, whose horizontal, parallel axes are respectively above and below the blank and in the same vertical plane. The lower roller 32 has in section the shape of a circular arc with a radius slightly smaller than the preshaping rollers 28. The upper roller 30 has a projecting portion 30a with a section in the form of an isosceles trapezium, on the edges of which bear the lateral edges of the longitudinal slit formed on the tube blank. Therefore this slit is perfectly upwardly oriented and centered with respect to the vertical plane containing the axis of the metal tube blank.

On referring once again to FIG. 1, it is possible to see that downstream of the tube orientation rollers 30 and 32, the ribbon R successively passes into the tube dies 34,36, whose internal diameters progressively decrease, which has the effect of progressively closing the ribbon R around the guide tube 10. More specifically, and in the manner better illustrated by FIGS. 7 and 8, the internal diameter of the second die 36 is such that the metal ribbon passing out of the latter is in the form of a closed tube T, whose lateral edges are in contact with one another along a longitudinal joint line L located along the upper generatrix of the tube T. The dies 34 and 36 are e.g. diamond dies making it possible to obtain the final shaping of the tube with the closed circular section. Obviously, the tube T formed in this way by the dies 34,36 surrounds the rectilinear guide tube 10 by which the optical fibres F are introduced.

As illustrated in FIG. 1, the closed tube passing out of the die 32 then passes in front of a welding station 38. The latter e.g. comprises a $CO_2$ laser 40, showing very diagrammatically in FIG. 1, which emits a laser beam towards the longitudinal joint line of the tube T and which is focussed slightly above said line by a focussing optics 42. The butt welding of the metal tube T takes place without any material addition under an argon atmosphere. For this purpose the part of the laser beam in the vicinity of the tube T is surrounded by a case 44 into which the argon is injected by a pipe 46. A case 48 is also placed around the tube T to the right of the welding station 38 and a pipe 50 also makes it possible to inject argon into the case 48.

Argon is also injected into the metal tube T slightly downstream of the welding area. In the embodiment shown, the argon is introduced by a supply pipe 52 running parallel to the guide tube 10 in the lateral positioning die 18 and in the slot 24a formed in the roller 24 and then issues into the guide tube 10 upstream of the rollers 28.

Advantageously, the metal tube T is positioned at the location of the welding station 38 by two pairs of maintaining rollers 54,56 respectively positioned upstream and downstream of the case 48. The rollers of each pair are placed on either side of the metal tube, in such a way that their vertical axes are parallel to one another and are located in the same transverse plane with respect to the tube T. On their outer surfaces, the rollers 54 and 56 have a concave profile, whose section is shaped like a circular arc with a radius equal to the external radius of the tube T passing out of the die 36.

On again referring to FIG. 1, it is possible to see that the welded tube passing out of the welding station 38 then passes into several diamond dies 58, whose internal diameter progressively decreases. The affect of these dies 58 is to stretch or draw out the tube T in order to give it its final diameter and ensure a perfect cylindrical shape. In view of the fact that the guide tube 10 terminates approximately to the right of the downstream end of the case 48, the dies also have the affect of facilitating the insertion of the fibres F into the welded tube T. Finally, they make it possible to increase the travel speed of the latter and consequently the module manufacturing rate.

That part of the apparatus which is shown in FIG. 1 also comprises means for continuously introducing a sealing product into the welded tube T, so as to ensure on the one hand the longitudinal sealing of the optical module and prevent on the other hand any longitudinal displacement of the optical fibres F within the tube T, which could lead to variations in the length ratio between the fibres and the tube obtained by means of the apparatus according to the invention.

The sealing product G is introduced into the tube T by an injection pipe 60, which laterally penetrates the tube during shaping, between the two pairs of rollers 24,26 and 30,32, approximately level with the rollers 28, via a longitudinal opening positioned at the said level in the upper part of the tube being formed, between the lateral edges of the metal ribbon R. The injection pipe 60 issues into the tube T slightly downstream of the corresponding end of the guide tube 10, in the immediate vicinity of the entrance of the first die 58 (FIG. 9). As shown in FIG. 8, the injection pipe 60 has, within the tube T being formed and then welded, a haricot bean-shaped section surrounding the guide tube 10.

It will be shown hereinafter that the relative positioning between the ends of the guide tube 10 and the sealing product injection pipe 6, makes it possible to permanently control the injection flow of the product into the tube T, so that it completely, but not excessively fills the said tube T.

As is very diagrammatically illustrated by FIG. 2, the optical module passing out of the dies 58 is cooled by a conventionally designed water circulation cooling circuit 62.

Different measurements are then carried out on the thus cooled optical module, so as to ensure according to the invention, a continuous checking of the ratio between the lengths of the fibres and the tube for an average given use temperature. The optical module advancing parallel to its axis consequently firstly traverses a first temperature measuring system 64, a system 66 making it possible to continuously measure the tube travel speed, by means of a roller 68 maintained elastically in contact with the outer surface of the tube, as well as a second system 70 for measuring the tube temperature. The optical modules CO then passes into a fault detector constituted by an eddy current coil 72 making it possible to check the quality of the weld made on the tube by means of a checking or control station 74 connected to the coil 72.

The linear travel of the tube T in the apparatus is obtained by exerting a tensile force on the said tube, downstream of the coil 72, by means of a capstan 76 rotated by an auto-synchronous motor 78. A force transducer diagrammatically illustrated at 80 is associated with the capstan 76 in order to permanently measure the tensile load effectively applied to the tube by the latter.

The signal supplied by the temperature measuring systems 64 and 70 the tube travel speed measuring system 66 and the force transducer 80 are transmitted to a central control station 82, which also receives information supplied by an operator by means of a console 84. Said information more particularly relates to the ratio of the lengths between the optical fibres and the metal tube of the optical module which it is wished to manufacture, the expansion coefficient, the modulus of elasticity of the metal used and the geometry of the manufactured tube.

On the basis of information displayed beforehand on the console 84 and instantaneous values of the signals received by the central control station 82, the latter determines by means of a previously established program, the instantaneous value of the speed at which the optical fibres must be introduced into the guide tube 10. This instantaneous value is permanently transmitted to the auto-synchronous motor 14 controlling the fibre introduction caterpillar or track 12, so as to ensure the automatic correction thereof.

After covering approximately ¾ of a turn on the capstan 76, the optical module CO is wound onto a reel 86 rotated by a geared motor 88. A position control tension pulley device is interposed between the capstan 76 and the reel 86, in order to keep constant the tension applied to the optical module on leaving the capstan 76.

The injection of the sealing product by the injection pipe 60 is controlled by an injection pump 92 (FIGS. 1 and 2) controlled by an auto-synchronous motor 94. The latter is controlled by a signal from the central control station 82 in response to the signal supplied by a pressure sensor 96 located in the argon supply pipe 52.

More specifically, on starting the injection of the sealing product G into the metal tube T when the apparatus is first put into use, the argon pressure detected by the sensor 96 is equal to the pressure of the argon injected by the supply pipe 52. As the sealing product flow is initially slightly in excess, it tends to flow back towards the upstream end with respect to the end of the injection pipe 60. After a certain time, it consequently blocks the end of the guide tube 10 by which the argon is introduced into the welded tube (FIG. 9) this leads to a sudden increase in the argon pressure detected by the sensor 96. When this sudden variation occurs, the central control station 82 gives an order to reduce by a given value $\Delta d$ the injection flow of the sealing product and which is transmitted to the auto-synchronous motor 94.

If a further sudden increase of the argon pressure is detected by the sensor 96 in a predetermined time period $\Delta t$ following the preceding detection, a further identical order is given by the control station 82. The sealing product injection flow is then again reduced by $\Delta d$.

However, if no blocking of the end of the guide tube 10 by the sealing product is detected during said predetermined time period $\Delta t$, the control station 82 gives an instruction having the effect of increasing the sealing product flow by a value equal to $\Delta d/2$.

If the end of the guide tube is again blocked by the sealing product during the following time period $\Delta t$, a new order is transmitted by the control station 82 to the auto-synchronous motor 94, which has the effect of reducing by the value $\Delta d$ the sealing product flow.

However, if a new time period $\Delta t$ elapses without the end of the guide tube 10 being blocked by the sealing product, a further order is given by the control station 82 to the auto-synchronous motor 94, in order to once again increase the flow by a value equal to half the preceding increase, i.e. $\Delta d/4$.

The apparatus continues to operate in this way throughout the manufacture of the optical module, which makes it possible to permanently maintain the flow of sealing product injected into the welded metal tube at a value such that the tube is perfectly filled, but without any excess and in particular without any deficiency.

As is shown in the left-hand part of FIG. 2, the apparatus according to the invention is also designed so that all the optical fibres placed within the same metal tube t have exactly the same length, so that the ratio between the fibre length and the tube length is exactly the same for each of the optical fibres. For this purpose, each of the fibres F is introduced into the fibre introduction caterpillar 12 with a constant tension identical between the individual fibres.

In the apparatus illustrated in FIG. 2, said result is obtained by unwinding each optical fibre F from a seperate reel 98, by means of a direct current motor 100 associated therewith. The fibre is then passed onto a position control tension pulley device 102 ensuring a precise regulation of the fibre tension. This tension is calculated so as to ensure an identical elongation for all the fibres. Each of the fibres F is then passed to a single capstan 104 located immediately upstream of the fibre introduction caterpillar 12 using return pulleys and the fibre performs approximately ¾ of a turn on said capstan. The capstan 104 is equipped with an encoder 106 making it possible to permanently measure the length of the fibres entering the fibre introduction caterpillar 12. The capstan is of the staged type for positioning neutral fibres of the optical fibres F1, F2, F3 on the same diameter, independent of the diameter of said fibres (cf. FIG. 10). All these means, together with the fact that the torque is negligible ensures the equality of the lengths of the fibres when they are unstressed. The information supplied by said encoder is also transmitted to the central control station 82, which makes it possible to ensure the introduction of the fibres into the metal tube at the desired speed, while compensating the slipping of the caterpillar 12.

The above description shows clearly that the optical module manufacturing apparatus according to the invention makes it possible to control in real time the ratio between the length of the optical fibres F and the length of the metal tube T in the optical module being manufactured, whilst taking account of the temperature of the tube leaving the cooler 62. Thus, optical modules are continuously and automatically produced, in which the relative length of the optical fibres is very accurately checked. It is also important to observe that it is possible to give said relative length of the fibres variable values and optionally to vary it during the manufacture of one and the same optical module.

The latter possibility is of great interest, particularly with regards to the manufacture of cables required to operate vertically under the tension of their own weight. In this case, the elongation of the cable is variable, with a maximum elongation in the upper part of the cable and a minimum elongation in the lower part. It is then possible to take account of the cable elongation variations in order to correct the value of the relative length of the optical fibres during the manufacture of the optical module, so that e.g. said relative length is constant in the cable installed.

Moreover, the apparatus according to the invention ensures a complete, non-excessive filling of the metal tube with the sealing product, which enables the latter to fulfil its function under optimum conditions.

Obviously the invention is not limited to the embodiment described in exemplified manner hereinbefore and in fact covers all variants thereof. Thus, in exemplified manner, the introduction of the fibres into the guide tube can be brought about by means other than the fibre introduction caterpillar or track described.

Moreover, the regulation of the sealing product injection flow brought about by a detecting the blocking of the guide tube can be performed according to a cycle differing from that described. In two constructional variants, the sealing product injection pipe 60 can be placed around the rectilinear guide tube 10 by which the optical fibres are introduced (FIG. 11) or can be directly connected to said guide tube (FIG. 12). In both cases, the argon supply pipe then issues slightly upstream of the guide tube, but downstream of the welding means.

It is also important to note that the rollers 30,32 can in certain cases be eliminated. This also applies with respect to the rollers 28 if, instead of introducing the sealing product by the bent tube 60, it is introduced and forced into a long straight tube, prior to any shaping of the tube T, upstream of the die 18.

We claim:

1. Process for the manufacture of optical modules incorporating a tight metal tube (T), in which is received at least one optical fibre (F) embedded in a sealing product (G), characterized in that it comprises the following stages:

introducing the optical fibre into a rectilinear guide tube (10) at a controlled introduction speed;

progressively shaping the metal tube around the guide tube from a metal ribbon (R) until a closed tube with a longitudinal joint line (L) is obtained;

welding said closed tube along the longitudinal joint line;

injecting the sealing product into the welded tube through an injection pipe (60) issuing into the said tube below the welding joint;

measuring the instantaneous values of the tensile force applied to the welded tube, the travel speed and the temperature of said welded tube; and controlling the speed of introduction of the optical fibre (F) into the guide tube (T) as a function of the measured instantaneous values, so as to obtain a predetermined ratio between the lengths of the metal tube and the optical fibre.

2. Process according to claim 1, characterized in that it also comprises the following stages:

introducing a neutral gas into the welded metal tube (T) by a supply pipe juxtaposed with the injection pipe (60) for the sealing product (G) and issuing upstream of the said pipe;

measuring the neutral gas pressure in the supply pipe; and regulating of the injection flow rate of the sealing product (G) as a function of sudden variations of the neutral gas pressure measured in the supply pipe and resulting from a closure or filling of said pipe by the sealing product (G).

3. Process according to claim 2, characterized in that the neutral gas is introduced by a supply pipe (52), which is connected to the guide tube (10) within the metal tube.

4. Process according to claim 1, characterized in that the sealing product (G) is injected by the injection pipe (60), which is connected to the guide tube (10) within the metal tube.

5. Process according to claim 1, characterized in that the welded metal tube (T) is drawn out prior to measuring said instantaneous values, downstream of the end of the guide tube (10).

6. Process according to claim 1, characterized in that the welded metal tube (T) is cooled before measuring said instantaneous values.

7. Process according to any one of the preceding claims, characterized in that several optical fibres (F)

are introduced into the guide tube (T) after rendering equal the lengths of each of the fibres.

8. Process according to claim 1, characterized in that the welding of the sealed metal tube (T) is checked.

9. Apparatus for the manufacture of optical modules incorporating a tight metal tube (T), in which is received at least one optical fibre (F) embedded in a sealing product (G), characterized in that is comprises:
   means (12) for introducing the optical fibre into a rectilinear guide tube (10) at a controlled introduction speed;
   means (24,26,28,30,32,34,36) for the progressive shaping of said metal tube around the guide tube (10) from a metal ribbon (R) making it possible to produce a closed tube having a longitudinal joint line (L);
   means (38) for welding the said closed tube along the longitudinal joint line (L);
   means (92,94) for injecting the sealing product (G) into the welded tube by an injection pipe (60) issuing into the latter downstream of the welding means (38);
   means (80,64,70) for measuring the instantaneous values of the tensile force applied to the welded tube, the travel speed and the temperature of the said welded tube and
   means (82) for controlling the introduction speed of the optical fibre into the guide tube by said means for introducing the fibre into the guide tube, as a function of said instantaneous values, so that the lengths of the metal tube and the optical fibre are in a predetermined ratio.

10. Apparatus according to claim 9, characterized in that it also comprises means for introducing a neutral gas into the welded metal tube, using a supply pipe (52) juxtaposed with the pipe (60) for injecting the sealing product and issuing upstream of said pipe; means (96) for measuring the pressure of the neutral gas in the supply pipe; and means (82) for regulating the injection flow rate of the sealing product as a function of variation of the measured neutral gas pressure resulting from a blocking of said suupply pipe by the sealing product.

11. Apparatus according to claim 9, characterized in that the means (58) for drawing out the welded tube are positioned downstream of the welding means (38) and upstream of the measuring means (80,64,70,68).

12. Apparatus according to claim 11, characterized in that cooling means (62) are positioned downstream of the drawing means (58) and upstream of the measuring means (80,64,70,68).

13. Apparatus according to claim 11, characterized in that the guide tube (10) issues into the metal tube (T) downstream of the welding means (38) and upstream of the drawing means (58).

14. Apparatus according to claim 11, characterized in that the drawing means incorporate a series of dies (58) having decreasing diameters.

15. Apparatus according to claim 9, characterized in that the means for progressively forming or shaping the metal tube incorporate a pair of rollers (24,26) for preshaping the edges of the ribbon (R), giving to said edges circular arc sections with a radius close to the radius of the sealed tube arriving at the welding means (38), as well as another series of dies (34,36) having decreasing diameters, one of the preshaping rollers for the edges of the ribbon having a groove (24a) into which passes the guide tube (10).

16. Apparatus according to claim 15, characterized in that a die (18) for the lateral positioning of the ribbon (R) is positioned upstream of the pair of preshaping rollers (24,26) for the edges of the ribbon, said die having a recess (22a) into which passes the guide tube (10).

17. Apparatus according to claim 9, characterized in that the means for introducing the optical fibre into the guide tube incorporate a fibre introduction caterpillar (12) having a travel speed controlled by a motor (14) controlled by said means (82) for checking the optical fibre introduction speed.

18. Apparatus according to claim 17, characterized in that it comprises, upstream of the fibre introduction caterpillar (12), a zero torque capstan (104) over which pass several optical fibres (F), each coming from a seperate reel (98), a tension producing means (102) being located between each reel and the zero torque capstan.

19. Apparatus according to claim 18, characterized in that each tension producing means comprises a position control means (102).

20. Apparatus according to claim 18, characterized in that a means (106) for measuring the travel speed of the optical fibres is placed on the zero torque capstan (104) and delivers a signal transmitted to the means (82) for checking the fibre introduction speed.

21. Apparatus according to claim 18, characterized in that the zero torque capstan (104) is a staged capstan making it possible to position the neutral fibres of the optical fibres F1, F2, F3 on a same diameter, independent of the diameter of said fibres.

22. Apparatus according to claim 9, characterized in that it comprises at least two pairs of closing rollers (54,56) maintaining in contact the edges of the sealed tube (T) along the longitudinal joint line (L) on either side of the welding means (38).

* * * * *

UNITED STATES PATENT AND TRADEMARK OFFICE
CERTIFICATE OF CORRECTION

PATENT NO.  : 5,143,274

DATED       : September 1, 1992

INVENTOR(S) : Jean-Jacques Laupretre, et al.

It is certified that error appears in the above-identified patent and that said Letters Patent is hereby corrected as shown below:

On the title page, item (75):   Inventors, line 1, "Laversines;" should be --Bresles--.

Column 5, line 51, delete "and".

Column 10, line 45, after "pipe" add -- (52)--.

Column 10, lines 67-68, "any one of the preceding claims," should be --claim 1--.

Signed and Sealed this

Seventh Day of September, 1993

Attest:

BRUCE LEHMAN

Attesting Officer    Commissioner of Patents and Trademarks